(12) United States Patent
Li et al.

(10) Patent No.: US 12,542,861 B2
(45) Date of Patent: Feb. 3, 2026

(54) PROCESSING METHOD FOR BOARD-WRITING DISPLAY AND RELATED APPARATUS

(71) Applicant: Beijing ESWIN Computing Technology Co., Ltd., Beijing (CN)

(72) Inventors: Weiqi Li, Beijing (CN); Yuandong Huang, Beijing (CN); Andy Zhou, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 423 days.

(21) Appl. No.: 18/164,714

(22) Filed: Feb. 6, 2023

(65) Prior Publication Data

US 2023/0353700 A1 Nov. 2, 2023

(30) Foreign Application Priority Data

Apr. 29, 2022 (CN) .......................... 202210471899.X

(51) Int. Cl.
*H04N 5/265* (2006.01)
*G06T 1/00* (2006.01)
(Continued)

(52) U.S. Cl.
CPC ........... *H04N 5/265* (2013.01); *G06T 1/0007* (2013.01); *G06T 1/60* (2013.01); *G06T 5/77* (2024.01); *G06T 2207/10016* (2013.01)

(58) Field of Classification Search
CPC ........ G09G 5/39; H04N 5/265; G06T 1/0007; G06T 1/60; G06T 5/77; G06T 2207/10016
(Continued)

(56) References Cited

U.S. PATENT DOCUMENTS 8,761,582 B2 * 6/2014 Kasuya .................. G06T 7/215
386/281
8,773,464 B2 * 7/2014 Campbell ............. G06F 3/0425
345/632
(Continued)

FOREIGN PATENT DOCUMENTS

CN 104092957 A 10/2014
CN 108024054 A 5/2018
(Continued)

OTHER PUBLICATIONS

Translation of Chinese Office Action for Chinese Application No. 202210471899X, dated May 23, 2025, 16 pages.

*Primary Examiner* — Jacinta M Crawford
(74) *Attorney, Agent, or Firm* — Westman, Champlin & Koehler, P.A.

(57) ABSTRACT

Disclosed is a processing method for board-writing display and a related apparatus. The processing method includes: outputting a composited image frame of a current frame according to the current frame and a complete board-writing image most recently outputted by an extraction module transmitted by a first thread; transmitting, in a case that the extraction module is in an idle state, a previous frame and the current frame to the extraction module by a second thread, to output a complete board-writing image again; determining, in a case that the current frame is not a last frame, a next frame of the current frame as a next current frame by the first thread, and returning to perform above steps. Thus, technical problem of poor real-time video processing performance is solved, effectively avoiding video stuttering in an application which performs video processing while playing a video.

9 Claims, 2 Drawing Sheets transmitting, by using a first thread, a current frame in a video and a complete board-writing image, which is most recently outputted by an extraction module, to a composition module, so as to output a composited image frame of the current frame by the composition module — S110 transmitting, in a case that the extraction module is in an idle state, a previous frame and the current frame in the video to the extraction module by using a second thread, so as to output a complete board-writing image by the extraction module again — S120 determining, in a case that the current frame is not a last frame in the video, a next frame of the current frame in the video as a next current frame by using the first thread, and returning to step S110 — S130

(51) Int. Cl.
*G06T 1/60* (2006.01)
*G06T 5/77* (2024.01)

(58) Field of Classification Search
USPC .......................................................... 345/629
See application file for complete search history.

(56) References Cited

U.S. PATENT DOCUMENTS

| | | | |
|---|---|---|---|
| 8,982,177 B2* | 3/2015 | Modai | G06V 40/23 |
| | | | 707/723 |
| 10,720,187 B2* | 7/2020 | Li | G11B 27/06 |
| 10,733,485 B2* | 8/2020 | Inomata | H04N 5/77 |
| 11,025,681 B2* | 6/2021 | Port | G06T 5/70 |
| 11,348,264 B1* | 5/2022 | Back | G06V 10/25 |
| 2004/0125115 A1 | 7/2004 | Takeshima et al. | |
| 2011/0145725 A1* | 6/2011 | Campbell | G06F 3/0425 |
| | | | 715/751 |
| 2016/0012295 A1* | 1/2016 | Imoto | G06V 20/47 |
| | | | 382/176 |
| 2017/0300752 A1* | 10/2017 | Biswas | G09B 5/02 |
| 2017/0372449 A1* | 12/2017 | Yarvis | H04N 5/265 |
| 2021/0409461 A1* | 12/2021 | Lin | H04N 21/8547 |

FOREIGN PATENT DOCUMENTS

| | | |
|---|---|---|
| CN | 108156520 A | 6/2018 |
| CN | 113706576 A | 11/2021 |
| CN | 114120163 A | 3/2022 |
| CN | 114202601 A | 3/2022 |
| CN | 114943663 A | 8/2022 |
| CN | 114945107 A | 8/2022 |
| JP | 2006148425 A | 6/2006 |

* cited by examiner

PROCESSING METHOD FOR BOARD-WRITING DISPLAY AND RELATED APPARATUS

CROSS-REFERENCE TO RELATED APPLICATION

The present disclosure claims priority to a Chinese patent application No. 202210471899.X, filed on Apr. 29, 2022, entitled "PROCESSING METHOD FOR BOARD-WRITING DISPLAY AND RELATED APPARATUS", published as CN114942738 A on Aug. 26, 2022, which is incorporated herein by reference in its entirety.

FIELD OF TECHNOLOGY

The present disclosure relates to a field of video processing technology, and in particular, to a processing method for board-writing display and a related apparatus.

BACKGROUND

With the popularity of online education, teaching video has become an indispensable type of educational resource. The teaching video is a video taken in a teaching scene by use of a camera equipment. In the teaching scene, a teacher may occlude board writing due to teaching needs, and image frames contained in the teaching video cannot fully present board-writing data. In order for students not to miss the board-writing data when watching the teaching video, the teaching video needs to be processed by performing processing, which not only includes a process for extracting a complete board-writing image by an extraction module, but also includes a process for compositing the complete board-writing image and an image frame in the video by a composition module. Because the whole processing performed on the teaching video involves many complex calculations, real-time processing performance may be poor, and there will be video stuttering problem in an application which performs video processing while playing a video.

SUMMARY

To solve the foregoing technical problems, an objective of the present disclosure is to provide a processing method for board-writing display and a related apparatus for a video.

According to a first aspect of the present disclosure, a processing method for board-writing display is provided, and includes:
transmitting, by using a first thread, a current frame in a video and a complete board-writing image, which is most recently outputted by an extraction module, to a composition module, so as to output a composited image frame of the current frame by the composition module;
transmitting, in a case that the extraction module is in an idle state, a previous frame and the current frame in the video to the extraction module by using a second thread, so as to output a complete board-writing image by the extraction module again; and
determining, in a case that the current frame is not a last frame in the video, a next frame of the current frame in the video as a next current frame by using the first thread, and returning to the step of transmitting a current frame in the video and a complete board-writing image most recently outputted by the extraction module to a composition module.

Optionally, the processing method further includes:
storing, by using the second thread, a complete board-writing image extracted by the extraction module in a first memory variable each time when the complete board-writing image is outputted by the extraction module, where
the first thread obtains a complete board-writing image most recently outputted by the extraction module by reading the first memory variable; and
the first thread and the second thread are executed in parallel.

Optionally, the processing method further includes:
storing, by using the first thread, the previous frame of the current frame in the video in a second memory variable and the current frame in a third memory variable, wherein,
the first thread obtains the current frame by reading the third memory variable, and the second thread obtains the previous frame of the current frame in the video by reading the second memory variable and obtains the current frame by reading the third memory variable; and
the step of determining a next frame of the current frame in the video as a next current frame by using the first thread includes: storing, by using the first thread, the current frame in the second memory variable and the next frame of the current frame in the video in the third memory variable.

Optionally, the processing method further includes:
generating a write completion signal by the first thread while reading the third memory variable, wherein,
the second thread reads the second memory variable and the third memory variable based on the write completion signal.

Optionally, the processing method further includes:
generating, after the second thread reads the second memory variable and the third memory variable, a read completion signal by the second thread, wherein,
the first thread stores the current frame in the second memory variable and the next frame of the current frame in the video in the third memory variable based on the read completion signal.

Optionally, the first memory variable, the second memory variable, and the third memory variable are defined and initialized by the first thread before the current frame in the video and the complete board-writing image most recently outputted by the extraction module are transmitted to the composition module.

Optionally, the complete board-writing image most recently outputted by the extraction module is achieved based on that the second thread transmits a target frame and a previous frame in the video to the extraction module; and
the extraction module is in an idle state in a case that an interval between the current frame and the target frame is a preset interval value.

Optionally, the preset interval value is determined by a time period spent by the extraction module to output a complete board-writing image and a time period spent by the composition module to output a composited image frame.

According to a second aspect of the present disclosure, an electronic device is provided, and includes: a processor, a memory, and a program stored in the memory and executable by the processor. When executed by the processor, the program enables the step of any one of the methods according to the first aspect.

According to a third aspect of the present disclosure, a computer-readable storage medium having a computer program or an instruction stored thereon is provided, where when executed by a processor, the computer program or the instruction enables the step of any one of the methods according to the first aspect.

The present disclosure has following advantages:

According to embodiments of the present disclosure, a processing method for board-writing display is provided, and includes: transmitting, by using a first thread, a current frame in a video and a complete board-writing image, which is most recently outputted by an extraction module, to a composition module, so as to output a composited image frame of the current frame by the composition module; transmitting, in a case that the extraction module is in an idle state, a previous frame and the current frame in the video to the extraction module by using a second thread, so as to output a complete board-writing image by the extraction module again; and determining a next frame of the current frame in the video as a next current frame by using the first thread, and returning to the step of transmitting a current frame in the video and a complete board-writing image most recently outputted by the extraction module to a composition module. Therefore, the composition module may output a composited image frame of each frame in the video, and the extraction module may output a complete board-writing image in a frame skipping manner.

Since an updating frequency of board writing may not be high in a real scene, the complete board-writing image obtained by frame skipping can still meet the user's demand of not missing board-writing data after the complete board-writing image is composited into multiple frames of the video by using the foregoing method. Considering that it takes a long time for the extraction module to extract a complete board-writing image in the process of video processing, performing frame skipping to get a complete board-writing image can effectively solve the technical problem of poor real-time video processing performance caused by the time consumed by the extraction module, so as to effectively avoid video stuttering phenomenon in an application which performs video processing while playing a video.

It is to be noted that the general description above and the detailed description below are only illustrative and explanatory and do not limit the present disclosure.

BRIEF DESCRIPTION OF THE DRAWINGS

In order to explain technical solutions according to the embodiments of the present disclosure more clearly, drawings corresponding to the embodiments of the present disclosure are briefly introduced below, wherein.

DESCRIPTION OF THE EMBODIMENTS

Figure 1:
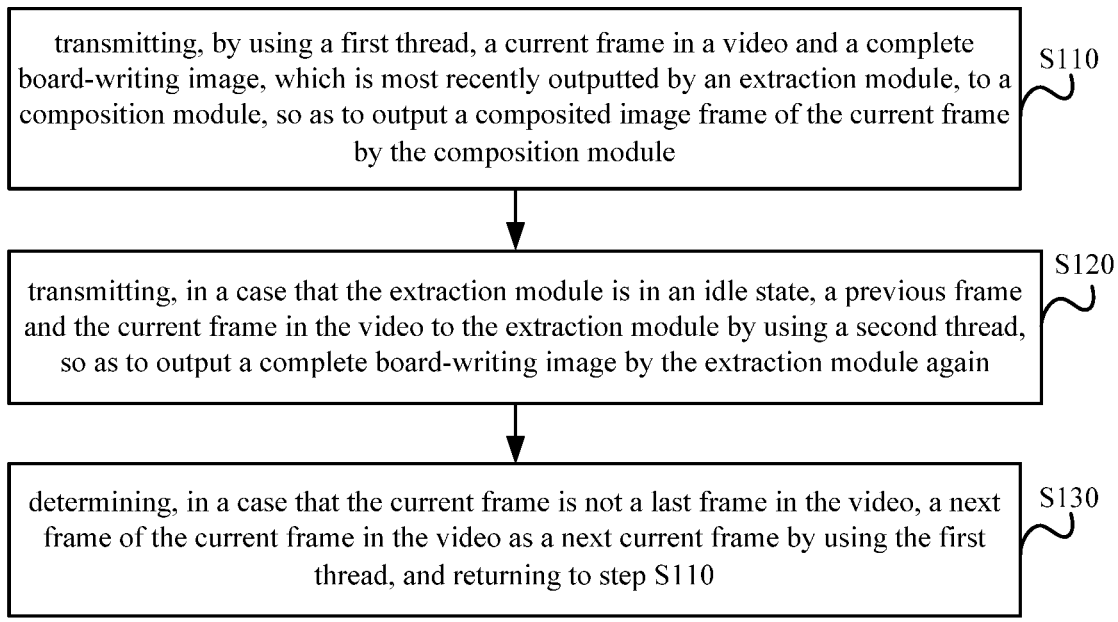
FIG. 1 is a flowchart of a processing method for board-writing display according to an embodiment of the present disclosure.

To facilitate understanding the present disclosure, a more comprehensive description of the present disclosure is provided below with reference to the accompanying drawings. Preferred embodiments of the present disclosure are provided in the accompanying drawings. However, the present disclosure can be implemented in different forms and is not limited to the embodiments described here. An objective of providing these embodiments is to provide a more thorough understanding of the disclosed content of the present disclosure.

In order for students to not miss the board-writing data when watching the teaching video, the teaching video occluded by the teacher needs to be processed by performing processing, which not only includes a process for extracting a complete board-writing image by an extraction module, but also includes a process for compositing the complete board-writing image and an image frame in the video by a composition module.

Specifically, for extracting a complete board-writing image of an image frame in a video, the extraction module first needs to segment a portrait by using that image frame and a previous frame in the video; then extracts, based on the segmented portrait, a board-writing image requiring for board-writing data completion due to the teacher's occlusion; and completes the board-writing image requiring for board-writing data completion of the image frame by using a complete board-writing image of other image frame extracted previously, so as to obtain a complete board-writing image of the image frame. After the extraction module extracts the complete board-writing image of the image frame, the composition module composites the complete board-writing image of the image frame and the image frame to obtain a composited image frame of the image frame which can present complete board-writing data.

In practical application, it is certainly necessary to output a composited image frame of each image frame in a video in real time. However, the foregoing video processing process involves many complex calculations, the real-time processing performance is poor, and there will be video stuttering problem in an application which performs video processing while playing a video. In view of this, an embodiment of the present disclosure provides a processing method for board-writing display.

A video processed by the processing method is a video with a writing board, and the writing board in the video may not present a complete board-writing image due to the occlusion of a target object. The video may be a teaching video, or may be another video with a writing board. In the following descriptions, unless otherwise specified, each frame in a video is an original image frame, and the composition module outputs a composited image frame corresponding to the original image frame. One original image frame corresponds to one composited image frame. After processing a video by using the processing method according to an embodiment of the present disclosure, playing the video indicates to play the composited image frames obtained after the processing.

FIG. 1 shows a processing method for board-writing display according to an embodiment of the present disclosure. Before performing the processing method, two threads need to be first initialized and started. The two threads are a first thread and a second thread, respectively. Referring to FIG. 1, the processing method may include following steps.

Step S110, transmitting, by using a first thread, a current frame in a video and a complete board-writing image, which is most recently outputted by an extraction module, to a composition module, so as to output a composited image frame of the current frame by the composition module.

Specifically, when the processing method starts to be performed, the current frame is a second frame in the video.

The first thread may transmit a first frame in the video to an extraction module, and the extraction module segments a target object from the first frame by using a neural network and extracts a board-writing image from the first frame according to the segmented target object. Then, the first thread transmits the board-writing image extracted from the first frame and the first frame to a composition module, and the composition module outputs a composited image frame of the first frame. It is to be understood that, the first frame is used as an initial frame, and the board-writing image extracted from the first frame is directly used as a complete board-writing image. Moreover, when the processing method starts to be performed, the first thread transmits the second frame and the board-writing image (that is, a complete board-writing image most recently outputted by the extraction module) extracted from the first frame in the video to the composition module.

Step S120, transmitting, in a case that the extraction module is in an idle state, a previous frame and the current frame in the video to the extraction module by using a second thread, so as to output a complete board-writing image by the extraction module again.

Specifically, when the processing method starts to be performed, the extraction module is in an idle state, and therefore, the second frame and the first frame in the video need to be transmitted to the extraction module by using the second thread. In a subsequent performing process, that is, when the current frame is any frame after the second frame in the video, whether the extraction module is in an idle state or not may be uncertain. In this case, whether the extraction module is in an idle state may be determined first by using the second thread before step S120 is performed. If the extraction module is in an idle state, step S120 is performed. If the extraction module is in a busy state of extracting a complete board-writing image, the second thread does not transmit the current frame and the previous frame in the video to the extraction module. In this case, the extraction module may output a complete board-writing image every several frames, and the extraction module may not have stack of tasks.

Step S130, determining, in a case that the current frame is not a last frame in the video, a next frame of the current frame in the video as a next current frame by using the first thread, and return to step S110.

Specifically, whether the current frame is a last frame in the video may be determined first before step S130 is performed. If the current frame is not the last frame in the video, the thread determines a next frame of the current frame in the video as a next current frame, and then step S110 is returned to, so as to output a composited image frame of the next current frame by the composition module. If the current frame is the last frame in the video, the step ends.

It is to be noted that, a time period spent by the composition module to output a composited image frame is less than a time period spent by the extraction module to output a complete board-writing image. The foregoing steps S110, S120, and S130 are performed successively and in a performing speed which ensures that the composition module is in an idle state each time when the composition module is invoked in step S110.

In an embodiment of the present disclosure, the extraction module outputs a complete board-writing image every several frames, and the composition module is configured to composite each frame and a complete board-writing image, which is most recently outputted by the extraction module in the video. For a real scene with a low updating frequency of the board writing, the processing method may completely meet users' requirements of not missing board-writing data. The extraction module outputs a complete board-writing image in a frame skipping manner, and can perform received tasks in time. Therefore, the technical problem of poor real-time video processing performance is resolved effectively, so as to effectively avoid video stuttering phenomenon in an application which performs video processing while playing a video.

In an optional embodiment, the processing method for board-writing display further includes: storing, by using the second thread, the complete board-writing image extracted by the extraction module in a first memory variable each time when the complete board-writing image is outputted by the extraction module. In this case, step S110 of transmitting, by the first thread, a complete board-writing image, which is most recently outputted by the extraction module, to the composition module, comprises first obtaining the complete board-writing image most recently outputted by the extraction module by reading the first memory variable.

Specifically, the first thread and the second thread are executed in parallel. The second thread is configured to transmit a current frame and a previous frame in a video to the extraction module, and further to monitor the extraction module and store, when detecting that a complete board-writing image is outputted by the extraction module, the complete board-writing image outputted by the extraction module in the first memory variable. The first thread is configured to obtain, by reading the first memory variable, a complete board-writing image most recently outputted by the extraction module, and further to transmit the complete board-writing image most recently outputted by the extraction module and a current image frame to the composition module.

In an embodiment of the present disclosure, the first thread is configured for the composition module, and the second thread is configured for the extraction module. The first thread and the second thread are executed in parallel, so that the complete board-writing image outputted by the extraction module is stored in the first memory variable by using the second thread in time, and the composition module can accurately obtain, by using the first thread, the complete board-writing image most recently outputted by the extraction module.

Figure 2:
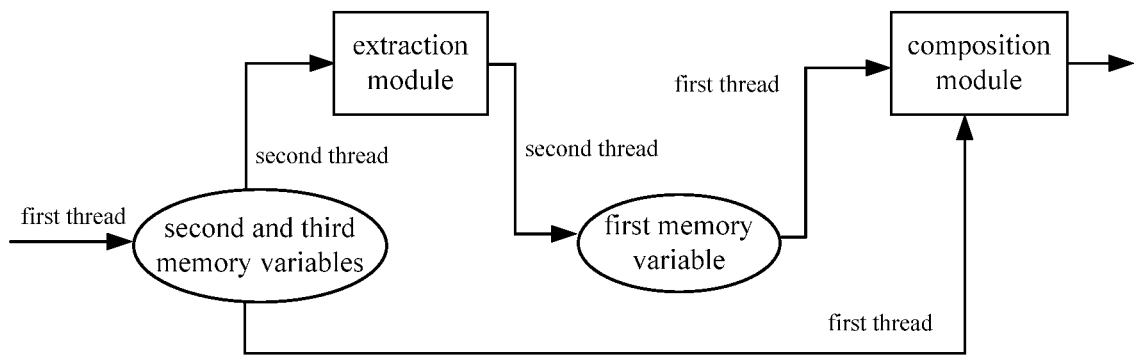
FIG. 2 is a schematic diagram of performing a processing method for board-writing display according to an embodiment of the present disclosure.

FIG. 2 is a schematic diagram of performing a processing method for board-writing display according to an embodiment of the present disclosure. Referring to FIG. 2, the processing method may further include: storing, by using the first thread, the previous frame of the current frame in the video in a second memory variable and the current frame in a third memory variable. In this case, step S110 of transmitting, by the first thread, the current frame in the video to the composition module, comprises first obtaining the current frame by reading the third memory variable. Step S120 of transmitting, by the second thread, the current frame and the previous frame in the video to the extraction module, comprises first obtaining the previous frame of the current frame in the video by reading the second memory variable and obtaining the current frame by reading the third memory variable. Step S130 of determining a next frame of the current frame in the video as a next current frame by using the first thread includes: storing, by using the first thread, the current frame in the second memory variable and the next frame of the current frame in the video in the third memory variable.

Further, in step S110, the first thread may further generate a write completion signal when reading the third memory variable; and then in step S120, the second thread reads the second memory variable and the third memory variable based on the write completion signal. The write completion signal here plays a role of indicating the second thread to read data.

Further, in step S120, the second thread may further generate a read completion signal after reading the second memory variable and the third memory variable; and then in step S130, the first thread stores, based on the read completion signal, the current frame in the second memory variable and the next frame of the current frame in the video in the third memory variable. The read completion signal here plays a role of indicating the first thread to update the second memory variable and the third memory variable.

It is to be noted that, in step S120, whether the extraction module is in an idle state or not, the second thread reads the second memory variable and the third memory variable under the instruction of the write completion signal and generates the read completion signal after that. The second thread does not transmit the current frame and the previous frame in the video to the extraction module any more when the extraction module is in a busy state. However, in step S130, if the current frame is a last frame in the video, the first thread may not update the second memory variable and the third memory variable under the instruction of the read completion signal.

The first memory variable, the second memory variable, and the third memory variable are all global variables, that is, the foregoing three always exist during performing the processing method. The three memory variables may be defined and initialized by the first thread before step S110. Being defined indicates that storage positions identified by the memory variables are determined, and being initialized indicates that the storage positions identified by the memory variables are cleared to store data according to the foregoing method.

In an optional embodiment, in step S110 in the foregoing processing method, the complete board-writing image most recently outputted by the extraction module is obtained by transmitting a target frame and the previous frame in the video to the extraction module by the second thread. If an interval between the current frame and the target frame in step S110 is a preset interval value m, the extraction module is determined to be in an idle state before step S120 is performed. In this case, there is no need to determine a running state of the extraction module each time before step S120 is performed.

The preset interval value m may be determined by a time period t1 spent by the extraction module to output a complete board-writing image and a time period t2 spent by the composition module to output a composited image frame. Specifically, the preset interval value m may be set as a minimum integer not less than t1/t2. Because the time period t1 spent by the extraction module to output a complete board-writing image may vary, and the time period t2 spent by the composition module to output a composited image frame may also vary, the preset interval value m may be calculated by using t1 and t2 every period of time. Then whether the extraction module is in an idle state is determined according to the calculated preset interval value m before step S120 is performed, which is beneficial for ensuring that the extraction module can perform task in time.

Figure 3:
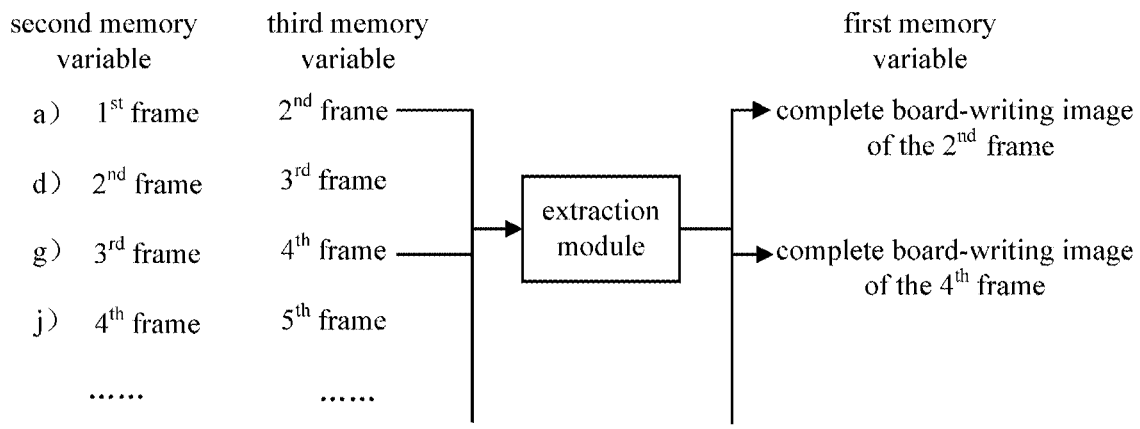
FIG. 3 is an exemplary flowchart of processing a video by using the processing method according to an embodiment of the present disclosure.

For example, when processing first 5 frames of the video, the preset interval value m is 3. Before the processing method for board-writing display starts to be performed, the first thread transmits a first frame to the extraction module, and stores a result outputted by the extraction module in the first memory variable, and then transmits the first memory variable and the first frame to the composition module, for the composition module to output a composited image frame of the first thread. Referring to FIG. 3, the processing method for board-writing display starts from the second frame, and may include the following steps.

a) Before step S110 is performed for the first time, the first thread stores the first frame in the video in the second memory variable, and stores the second frame in the third memory variable. The second frame is the current frame.

b) When step S110 is performed for the first time, the first thread reads the first memory variable and the third memory variable and generates a write completion signal at the same time, and then transmits the read second frame and the complete board-writing image extracted by the extraction module from the first frame to the composition module, for the composition module to output a composited image frame of the second frame.

c) The second thread reads the second memory variable and the third memory variable based on the write completion signal in step S120, and generates a read completion signal after reading. Further, in this case, the extraction module is in an idle state, and therefore the read first frame and second frame need to be transmitted to the extraction module, for the extraction module to output a complete board-writing image of the second frame.

d) Because the second frame is not the last frame in the video, step S130 is performed based on the read completion signal. That is, the first thread updates the second memory variable and the third memory variable based on the read completion signal. Specifically, the first thread stores the second frame in the second memory variable and stores the third frame in the third memory variable, and then step S110 is returned to. The third frame is the current frame.

e) When step S110 is performed for the second time, the first thread reads the first memory variable and the third memory variable and generates a write completion signal at the same time, and then transmits the read third frame and the complete board-writing image extracted by the extraction module from the first frame to the composition module, for the composition module to output a composited image frame of the third frame.

f) The second thread reads the second memory variable and the third memory variable based on the write completion signal in step S120, and generates a read completion signal after reading. Further, an interval between the third frame and the first frame is not the preset interval value m, and therefore the read second frame and third frame are not transmitted to the extraction module.

g) Because the third frame is not the last frame in the video, step S130 is performed based on the read completion signal. That is, the first thread updates the second memory variable and the third memory variable based on the read completion signal. Specifically, the first thread stores the third frame in the second memory variable and stores a fourth frame in the third memory variable, and then step S110 is returned to. The fourth frame is the current frame.

h) When step S110 is performed for the third time, the first thread reads the first memory variable and the third memory variable and generates a write completion signal at the same time, and then transmits the read fourth frame and the complete board-writing image extracted by the extraction module from the first frame to the composition module, for the composition module to output a composited image frame of the fourth frame.

i) The second thread reads the second memory variable and the third memory variable based on the write completion signal in step S120, and generates a read completion signal after reading. Further, an interval between the fourth frame and the first frame is the preset interval value m, and therefore the read third frame and fourth frame are transmitted to the extraction module, for the extraction module to output a complete board-writing image of the fourth frame. When the extraction module outputs the complete board-writing image of the second frame, the second thread stores the complete board-writing image of the second frame in the first memory variable, that is, the first memory variable is updated.

j) Because the fourth frame is not the last frame in the video, step S130 is performed based on the read completion signal. That is, the first thread updates the second memory variable and the third memory variable based on the read completion signal. Specifically, the first thread stores the fourth frame in the second memory variable and stores a fifth frame in the third memory variable, and then step S110 is returned to. The fifth frame is the current frame.

k) When step S110 is performed for the fourth time, the first thread reads the first memory variable and the third memory variable and generates a write completion signal at the same time, and then transmits the read fifth frame and the complete board-writing image extracted by the extraction module from the second frame to the composition module, for the composition module to output a composited image frame of the fifth frame.

It is to be noted that, for processing steps of frames after the fifth frame in the video, reference may be made to the foregoing step e) to step k), and the second memory variable and the third memory variable are not updated any more through step S130 until the last frame in the video is processed, that is, the processing process ends.

During processing the frames after the fifth frame in the video, if a preset interval value m remains unchanged, the extraction module successively outputs a complete board-writing image of the seventh frame, a complete board-writing image of the tenth frame, a complete board-writing image of the thirteenth frame, and the like. An interval between frames of two adjacent complete board-writing images outputted by the extraction module is the preset interval value m. If the preset interval value m changes, the interval between frames of two adjacent complete board-writing images outputted by the extraction module is still the preset interval value m, but the complete board-writing image of the seventh frame is not outputted any more after the complete board-writing image of the fourth frame is outputted.

In the foregoing examples, a board-writing image extracted from the first frame is used when the processing method starts to be performed, and therefore, after outputting complete board-writing images of two frames, the extraction module needs to extract a complete board-writing image of the fourth frame. To ensure that the extraction module does not have stack of tasks all the way, the preset interval value m may be preset as a minimum integer not less than (t1/t2+1).

Figure 4:
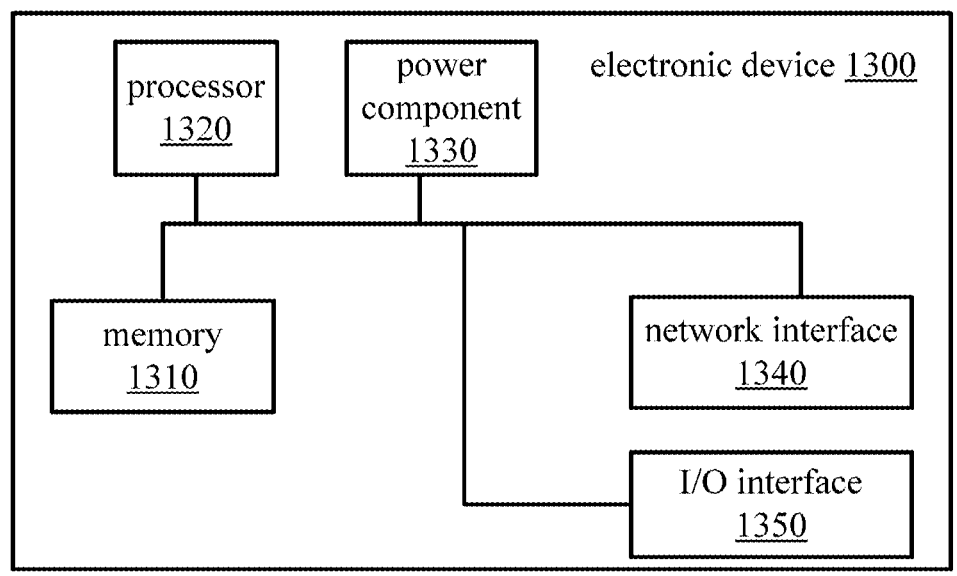
FIG. 4 is a schematic structural diagram of an electronic device according to an embodiment of the present disclosure.

An embodiment of the present disclosure further provides an electronic device 1300 as shown in FIG. 4, including a memory 1310, a processor 1320, and a program stored in the memory 1310 and executable by the processor 1320, where when executed by the processor 1320, the program enables the processes of the embodiments of the foregoing processing method, which can have the same technical effect. To avoid repetition, details are not repeated herein.

It is to be noted that, the first thread and the second thread used to perform the processing method may be run by different cores in the processor 1320, so that the first thread and the second thread can be executed in parallel. Each of the extraction module and the composition module used to perform the processing method may also be a core inside the processor, which is different from the cores running the first thread and the second thread. In this case, the extraction module, the composition module, the first thread, and the second thread can run respective tasks at the same time. The extraction module and the composition module may alternatively be processing devices located outside the processor 1320 but capable of communicating with the processor 1320 inside the electronic device 1300.

Certainly, the electronic device 1300 may further include a power component 1330, a network interface 1340, an input-and-output (I/O) interface 1350, and other auxiliary sub-devices.

It is understood by persons of ordinary skills in the art that all or part of the steps in the various methods of the above embodiments may be accomplished by instructions, or by instructions controlling the associated hardware, stored in a computer-readable storage medium and loaded and executed by the processor. In view of this, an embodiment of the present disclosure further provides a computer-readable storage medium on which a computer program or an instruction is stored. When the computer program or the instruction is executed by the processor, each process of the embodiments in the processing method may be implemented. The computer-readable storage medium may be a medium such as USB flash drive, portable hard drive, Read-Only Memory (ROM), Random Access Memory (RAM), diskette or compact disc can store program code.

The instructions stored in the readable storage medium can perform steps in any processing method provided in the embodiments of the present disclosure. Therefore, the beneficial effect of any processing method provided in the embodiments of the present disclosure may be achieved. Reference may be made to the foregoing embodiments, and details are not repeated herein again. The specific implementation of the foregoing operations can be referred to the previous embodiments, and will not be repeated here.

It is to be noted that when describing each embodiment in this specification, it focuses on the differences with other embodiments, and the same or similar parts among embodiments can be referred to each other for understanding. For system embodiments, as they are basically similar to method embodiments, the relevant points can be referred to the description of the method embodiments section.

In addition, it is to be noted that in the apparatus and methods in the present disclosure, it is obvious that the components or steps can be separated and/or recombined. Such decomposition and/or recombination shall be deemed to be the equivalent of the present disclosure. Also, the steps that perform the above series of processes can naturally be executed chronologically in the order described, but they do not necessarily have to be chronological, and some steps can be executed in parallel or independently of each other. All or any of the steps or components of the method and apparatus in the present disclosure can be understood by a person of ordinary skill in the art by means of hardware, firmware, software or a combination of them in any computing device (including a processor, a storage medium, etc.) or a network of computing devices. This is what persons of ordinary skills in the art can achieve by reading the present disclosure and using their basic programming skills.

Finally, it is to be noted that it is clear that the above embodiments are merely examples to clearly illustrate the present disclosure and are not limitations on implementations. A person of ordinary skill in the art may further make other changes or variations in a different form on the basis of the above description. Herein, examples are unnecessarily provided for all implementation manners. Any apparent change or alteration arising therefrom remains within the scope of the present disclosure.

What is claimed is:

1. A processing method for board-writing display, comprising:
    transmitting, by using a first thread, a current frame in a video and a complete board-writing image, which is most recently outputted by an extraction module, to a composition module, so as to output a composited image frame of the current frame by the composition module;
    transmitting, in a case that the extraction module is in an idle state, a previous frame and the current frame in the video to the extraction module by using a second thread, so as to output a complete board-writing image by the extraction module again; and
    determining, in a case that the current frame is not a last frame in the video, a next frame of the current frame in the video as a next current frame by using the first thread, and transmitting the next current frame in the video and a next complete board-writing image most recently outputted by the extraction module to the composition module,
    wherein the processing method further comprising:
    storing, by using the second thread, each complete board-writing image extracted by the extraction module in a first memory variable when each complete board-writing image is outputted by the extraction module, wherein
    the first thread obtains the complete board-writing image most recently outputted by the extraction module by reading the first memory variable; and
    the first thread and the second thread are executed in parallel.

2. The processing method according to claim 1, further comprising:
    storing, by using the first thread, the previous frame of the current frame in the video in a second memory variable and the current frame in a third memory variable, wherein
    the first thread obtains the current frame by reading the third memory variable, and the second thread obtains the previous frame of the current frame in the video by reading the second memory variable and obtains the current frame by reading the third memory variable; and
    the step of determining a next frame of the current frame in the video as a next current frame by using the first thread comprises: storing, by using the first thread, the current frame in the second memory variable and the next frame of the current frame in the video in the third memory variable.

3. The processing method according to claim 2, further comprising:
    generating a write completion signal by the first thread while reading the third memory variable, wherein
    the second thread reads the second memory variable and the third memory variable based on the write completion signal.

4. The processing method according to claim 3, further comprising:
    generating, after the second thread reads the second memory variable and the third memory variable, a read completion signal by the second thread, wherein
    the first thread stores the current frame in the second memory variable and the next frame of the current frame in the video in the third memory variable based on the read completion signal.

5. The processing method according to claim 2, wherein the first memory variable, the second memory variable, and the third memory variable are defined and initialized by the first thread before the current frame in the video and the complete board-writing image most recently outputted by the extraction module are transmitted to the composition module.

6. The processing method according to claim 1, wherein the complete board-writing image most recently outputted by the extraction module is achieved based on that the second thread transmits a target frame and a previous frame in the video to the extraction module; and
    the extraction module is in an idle state in a case that an interval between the current frame and the target frame is a preset interval value.

7. The processing method according to claim 6, wherein the preset interval value is determined by a time period spent by the extraction module to output a complete board-writing image and a time period spent by the composition module to output a composited image frame.

8. An electronic device, comprising: a processor, a memory, and a program stored in the memory and executable by the processor, wherein when executed by the processor, the program enables the step of the method according to claim 1.

9. A non-transitory computer-readable storage medium, having a computer program or an instruction stored thereon, wherein when executed by a processor, the computer program or the instruction enables the step of the method according to claim 1.

* * * * *